(12) United States Patent
Gilad-Bachrach et al.

(10) Patent No.: US 8,954,414 B2
(45) Date of Patent: Feb. 10, 2015

(54) SEARCH MODEL UPDATES

(75) Inventors: Ran Gilad-Bachrach, Bellevue, WA (US); Luke Evans Simon, Redmond, WA (US); Aparna Rajaraman, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 314 days.

(21) Appl. No.: 13/302,764

(22) Filed: Nov. 22, 2011

(65) Prior Publication Data

US 2013/0132378 A1   May 23, 2013

(51) Int. Cl.
*G06F 17/30* (2006.01)

(52) U.S. Cl.
CPC .................................. *G06F 17/30* (2013.01)
USPC ............................ 707/706; 707/723; 707/748

(58) Field of Classification Search
CPC .......... G06F 17/3053; G06F 17/30648; G06F 17/30864
USPC ................................................. 707/706–723
See application file for complete search history.

(56) References Cited

U.S. PATENT DOCUMENTS

| | | | |
|---|---|---|---|
| 6,470,261 B1 | 10/2002 | Ng et al. | |
| 7,444,327 B2* | 10/2008 | Watson et al. | 1/1 |
| 8,386,509 B1* | 2/2013 | Scofield et al. | 707/769 |
| 2003/0156762 A1* | 8/2003 | August | 382/260 |
| 2005/0135664 A1* | 6/2005 | Kaufhold et al. | 382/131 |
| 2007/0219988 A1* | 9/2007 | Mueller et al. | 707/5 |
| 2008/0005137 A1* | 1/2008 | Surendran et al. | 707/101 |
| 2008/0256050 A1* | 10/2008 | Zhang et al. | 707/5 |
| 2009/0265290 A1 | 10/2009 | Ciaramita et al. | |
| 2010/0153371 A1* | 6/2010 | Singh | 707/722 |
| 2010/0281012 A1 | 11/2010 | Imig et al. | |
| 2010/0299303 A1* | 11/2010 | Horster et al. | 706/52 |
| 2011/0093459 A1* | 4/2011 | Dong et al. | 707/725 |
| 2011/0145175 A1* | 6/2011 | Agarwal | 706/12 |
| 2011/0276565 A1* | 11/2011 | Zheng et al. | 707/724 |
| 2011/0296463 A1* | 12/2011 | Suslov | 725/44 |
| 2011/0314367 A1* | 12/2011 | Chang et al. | 715/230 |
| 2012/0089552 A1* | 4/2012 | Chang et al. | 706/52 |

OTHER PUBLICATIONS

Dong, et al., "Towards Recency Ranking in Web Search", Retrieved at <<http://www.wsdm-conference.org/2010/proceedings/docs/p11.pdf>>, Proceedings of the third ACM international conference on Web search and data mining (WSDM), Feb. 4-10, 2010, pp. 11-20.

(Continued)

*Primary Examiner* — Hanh Thai
(74) *Attorney, Agent, or Firm* — Sandy Swain; Judy Yee; Micky Minhas

(57) ABSTRACT

Search model updates are described. In one or more implementations, a search service uses a model to rank items in a search result, the model formed using an initial set of data. An update is generated using a subsequent set of data, which is formed after the initial set of data, that provides feedback describing user interaction with one or more items in the search result formed using the model, the generating of the update performed without use of at least a portion of the initial set of data. The model and the update are employed to rank items in a search result for a subsequent search.

19 Claims, 7 Drawing Sheets

(56) References Cited

OTHER PUBLICATIONS

Duchi, et al., "Adaptive Subgradient Methods for Online Learning and Stochastic Optimization", Retrieved at <<http://www.magicbroom.info/Papers/DuchiHaSi10.pdf>>, International Conference on Learning Theory (COLT), Journal of Machine Learning Research, vol. 12, 2010, pp. 1-40.

Lughofer, Edwin David, "FLEXFIS: A Robust Incremental Learning Approach for Evolving Takagi-Sugeno Fuzzy Models", Retrieved at <<http://ieeexplore.ieee.org/stamp/stamp.jsp?tp=&arnumber=4529084>>, IEEE Transactions on Fuzzy Systems, vol. 16, No. 6, Dec. 2008, pp. 1393-1410.

Chapelle, et al., "Future directions in learning to rank", Retrieved at <<http://jmlr.csail.mit.edu/proceedings/papers/v14/chapelle11b/chapelle11b.pdf>>, JMLR: Workshop and Conference, vol. 14, 2011, pp. 91-100.

Tsai, et al., "An Ensemble Ranking Solution for the Yahoo! Learning to Rank Challenge", Retrieved at <<http://www.csie.ntu.edu.tw/~htlin/paper/doc/wsltr10ensemble.pdf>>, Retrieved Date: 2010, pp. 1-10.

\* cited by examiner

SEARCH MODEL UPDATES

BACKGROUND

To locate particular content, users may interact with a search engine which may provide one or more search results to search for a wide variety of content. However, conventional techniques that were utilized to provide search results may become limited when confronted with different types of content.

For example, conventional search results included links to websites with brief textual descriptions. These search results were typically provided in response to keywords in a search request. However, the functionality of these conventional techniques may be limited in relation to other types of content, such as images, videos, and so on. Further, conventional techniques were often insufficient in determining a ranking of different types of content in relation to each other, such as how to rank a webpage in relation to an image in a search result page.

SUMMARY

Search model updates are described. In one or more implementations, a search service uses a model to rank items in a search result, the model formed using an initial set of data. An update is generated using a subsequent set of data, which is formed after the initial set of data, that provides feedback describing user interaction with one or more items in the search result formed using the model, the generating of the update performed without use of at least a portion of the initial set of data. The model and the update are employed to rank items in a search result for a subsequent search.

In one or more implementations, a search service uses a first model to rank items in a search result page and collects data that describes user engagement with individual items in the search result page. A gradient of an objective function is computed at the first model using the collected data. The gradient and the first model are used to arrive at a second model.

In one or more implementations, a search service forms a search result page that includes a plurality of items that are ranked through use of a plurality of models, each said model being configured to rank different types of content and formed using an initial set of data. Feedback is received that describes user interaction with one or more search results formed using the plurality of models. One or more updates for respective said models are generated using feedback in which each said update is generated without use of the initial set of data and the plurality of models and the generated updates are used to rank items in a subsequent search result page for a subsequent search.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Conventional techniques to perform a search may be limited when confronted with different types of content. For example, techniques that are utilized to rank different types of content in a search result page are confronted with an "apples to oranges" comparison, such as to determine how to rank images, videos, and webpages in relation to each other.

Conventional techniques that were used to perform this ranking often had limited flexibility. For example, conventional models that were utilized to generate a search ranking were generated through processing of a fixed set of data. Therefore, old models were not updated but rather a new model was created based on a set of data that included the data originally used to create the initial model. This could result in drastic changes to the rankings performed by the model, difficulty in predicting the changes that would result from the set of data, as well as consume a significant amount of resources to produce the new model.

Search model update techniques are described. In the techniques described herein, a model may be updated without re-processing data that was originally utilized to create the model. For example, feedback that describes engagement of users with a search result from a model may be used to form an update to the model. Thus, incremental changes may be made to the model, which may result in increased predictability and efficiency in generating the update as well as increased efficiency in generating the update without re-processing "old" data that was used to originally form the model. Further, these techniques may be used to address different types of content referenced in a search result page by leveraging knowledge of this engagement. A variety of other examples are also contemplated, further discussion of which may be found in relation to the following sections.

In the following discussion, an example environment is first described that is operable to perform search update techniques described herein. Examples procedures are then described, which are operable in the example environment as well as in other environments. Likewise, the example environment is not limited to performance of the example procedures.

Example Environment

Figure 1:
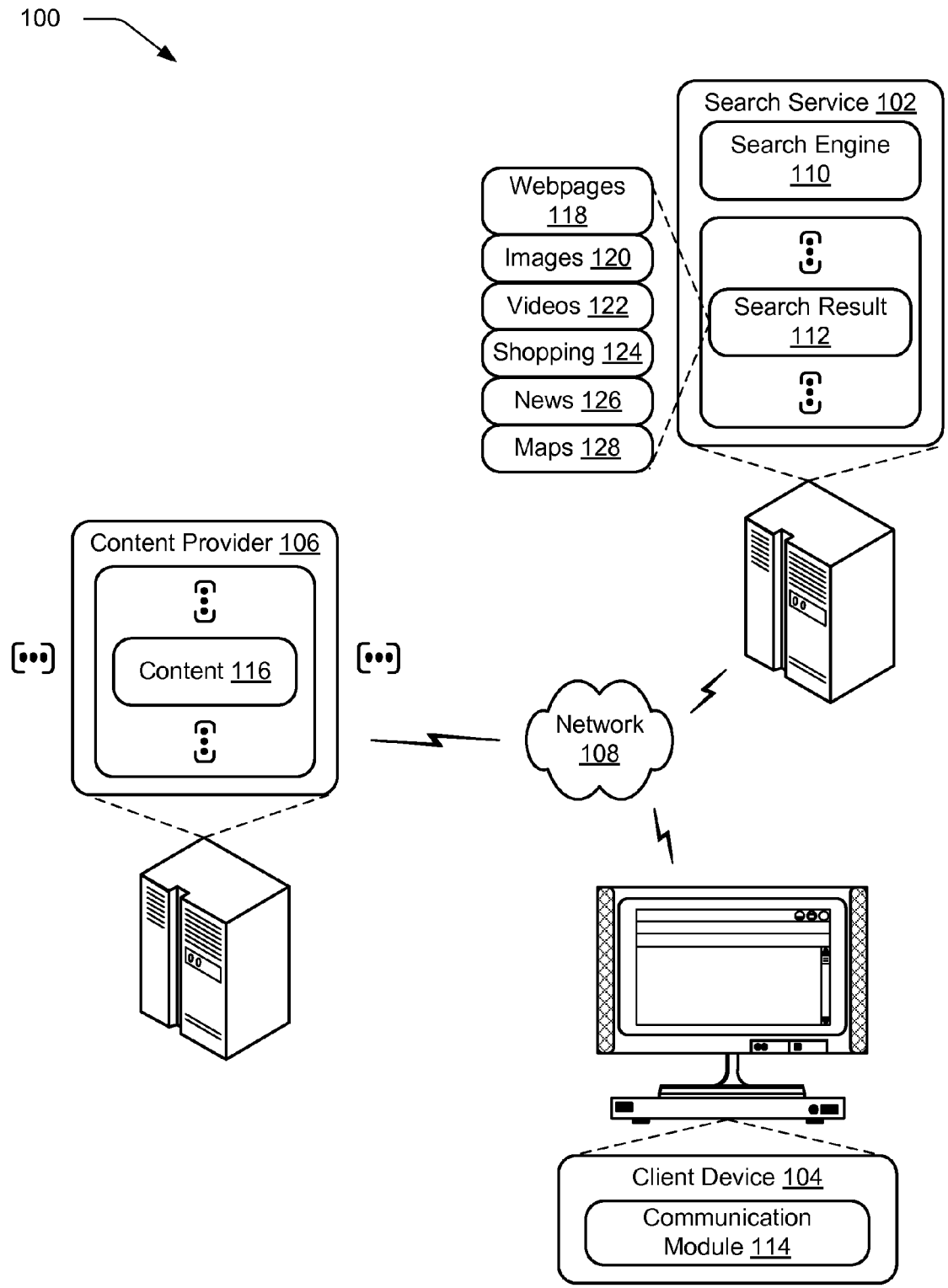
FIG. 1 is an illustration of an environment in an example implementation that is operable to employ search model update techniques.

FIG. 1 is an illustration of an environment 100 in an example implementation that is operable to employ search model update techniques. The illustrated environment 100 includes a search service 102, a client device 104, and a content provider 106, each of which are communicatively coupled, one to another, over a network 108.

Although the client device 104 is illustrated as being implemented by a conventional desktop computer and the search service 102 and content provider 106 are illustrated as being implemented by one or more servers, these entities may be implemented by a variety of different devices.

For example, the client device 104 may be configured as a computer that is capable of communicating over the network 108, such as a desktop computer, a mobile station, an entertainment appliance, a set-top box communicatively coupled to a display device, a wireless phone, a game console, a tablet computer, a netbook, and so forth. Thus, the client device 104 may range from a full resource device with substantial memory and processor resources (e.g., personal computers, game consoles) to a low-resource device with limited memory and/or processing resources (e.g., conventional set-top boxes, hand-held game consoles). Additionally, the devices may be representative of one or more devices, e.g., the search service 102 may be implemented as a network (e.g., web) service by a plurality of servers in a server farm. A variety of other examples are also contemplated.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The search service 102 is illustrated as including a search engine 110. The search engine 110 is representative of functionality to provide a search result 112 in response to a search query, e.g., a search result page. For example, a user of the client device 104 may interact with a communication module 114, which is representative of functionality of the client device 104 to interact with the network 108, such as a browser over the Internet. The communication module 114 may provide a query to the search service 102 (e.g., one or more keywords, images, spoken words, and so on) which causes the search engine 110 of the search service 102 to form a search result 112 to be returned to the client device 104.

The search engine 110 may employ a variety of different techniques to form the search result 112. For example, the search engine 110 may employ one or more software robots ("bots") to search and index content available over the Internet, such as content 116 from the content provider 106. A variety of different types of content may be included in the search result 112, such as references to webpages 118, images 120, videos 122, shopping 124, news 126, maps 128, and so on.

These indexes may be based on keywords and other information. Further, a variety of different techniques may be employed rank items in the index such that a user has an increased likelihood of finding content of interest. This data may then be used by the search engine 110 to form one or more models that are used to rank items in the search result 112 as further described in relation to FIG. 2.

Generally, any of the functions described herein can be implemented using software, firmware, hardware (e.g., fixed logic circuitry), or a combination of these implementations. The terms "module," "functionality," and "engine" as used herein generally represent software, firmware, hardware, or a combination thereof. In the case of a software implementation, the module, functionality, or engine represents program code that performs specified tasks when executed on a processor (e.g., CPU or CPUs) and is storable in one or more computer readable storage devices and thus is implementable at least partially in hardware. The features of the techniques described below are platform-independent, meaning that the techniques may be implemented on a variety of commercial computing platforms having a variety of processors.

For example, a computing device may also include an entity (e.g., software) that causes hardware of the computing device to perform operations, e.g., processors, functional blocks, and so on. For example, the computing device may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
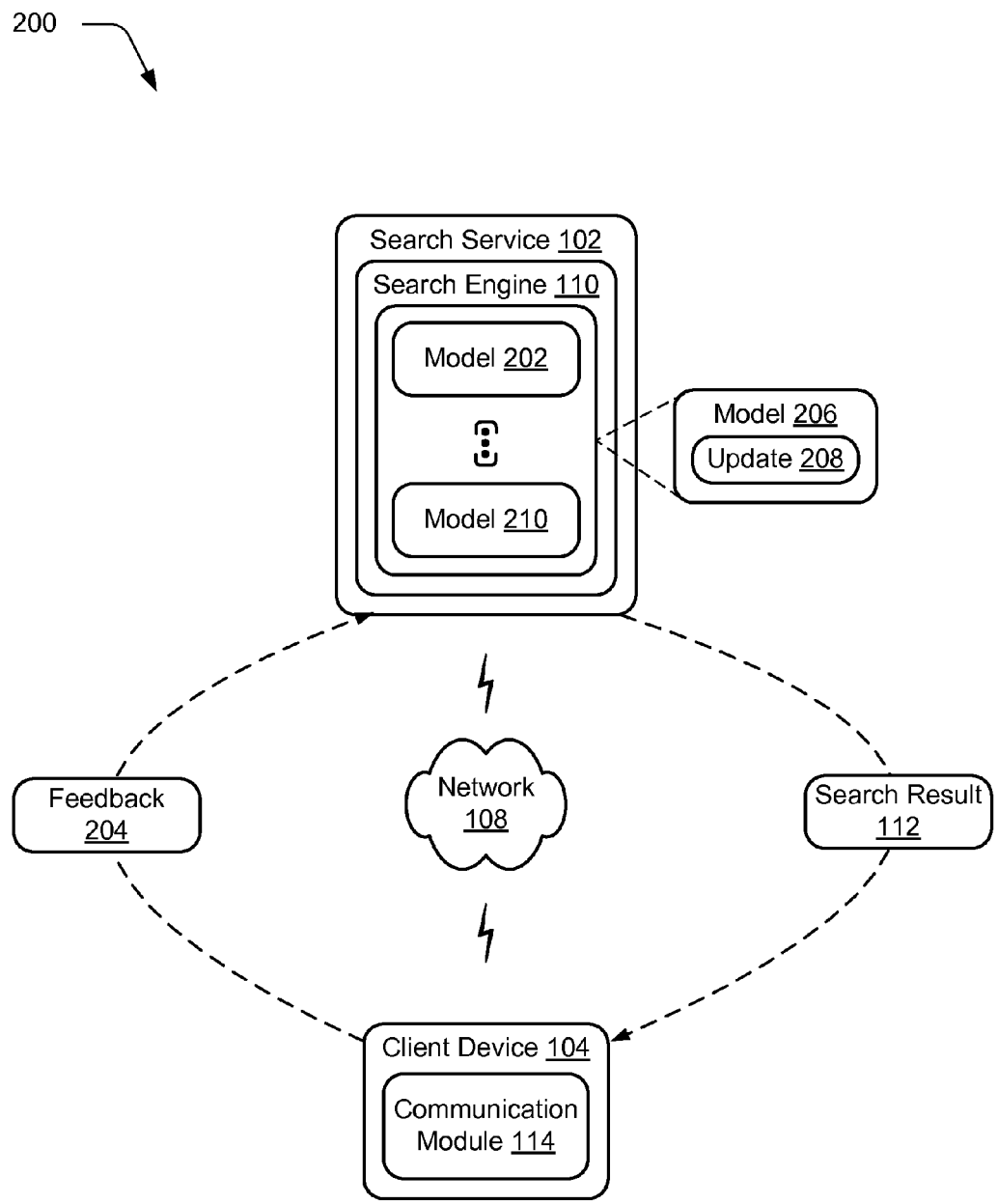
FIG. 2 is an illustration of a system in an example implementation showing a search engine of FIG. 1 in greater detail as employing one or more models to generate a search result and use of feedback to update the model.

FIG. 2 is an illustration of a system 200 in an example implementation showing the search engine 110 of the search service 102 in greater detail. Search engines are typically federated. As such, for each query models are configured for multiple verticals, such as image, video, news, and so on as described in relation to FIG. 1 to generate relevant results that are combined by the search engine 110 to form the search result page (SERP).

For example, the search engine 110 may employ one or more batch learning algorithms to generate a ranker that is capable of comparing the different entities on the SERP. Conventional techniques often relied on human judges or some functions of previous users' behavior to generate examples of the expected behavior. The learning algorithm was then used to generalize a model from these examples to form a generic ranking function. However, the labels used to generate these examples may not reliable, e.g., human judges fail in many cases in providing absolute relevance scores to incomparable items such as images versus web links. Human judges may also fail when there are multiple possible meanings to the query. Moreover, the process of collecting human judgments may be costly and time consuming. At the same time, conventional techniques that provide relevance scores based on historic engagements may be limited to provide scores to combinations that were already presented to a substantial amount of users. Hence, if a new ranking function is proposed, which differs significantly from previous rankers, it may not be evaluated correctly.

Further, conventional approaches may not be configured to efficiently scale. For example, conventional approaches may involve re-training of a model from scratch whenever new data arrives. Since the amount of data available increases, this generating may involve lengthy processes that consume a significant amount of computing resources. In another example, it may be difficult using conventional techniques to combine data that was generated in different time periods and was given different treatment. In a further example, in order to collect the data used for the training process, conventional techniques provided a degraded experience to a certain percentage of the users, which affects the overall satisfaction of the users with the search engine. Yet further, conventional approaches often failed to track changes in the environment. For example, users' preferences might change due to external events or to changes in the presentation of the entities on the page and therefore these changes could not be addressed in a timely manner due to inefficiencies in creating a new model using conventional techniques.

In one or more implementations described herein, however, an objective function is defined to encapsulate one or more goals from a ranker employed by the search engine 110. For example, assume entity "i" is displayed before entity "j" in an initial search result 112. However, due to a variety of different reasons it may now be desirable to rank entity "j" before entity "i". This can be expressed in a variety of ways, an example of which is as follows.

The ranker, for instance, may assign a score "$s_i$" to a first item and a score "$s_j$" to the second object such that the following expression is minimized:

$$\log(1+\exp(-\lambda(c_i-c_j)(s_i-s_j)))$$

The variables "$c_i$" and "$c_j$" represent interaction (e.g., a click count) received by respective items "i" and "j".

An online learning algorithm may then be employed to generate a model that minimizes the objective function. For example, a current model 202 may be used to rank entities in a search result 112. Feedback 204 that describes engagement of users may then be collected from the client device 104 (which is representative of a plurality of devices in this example) over a certain period of time, e.g., for a day.

The feedback 204 may then be used by the search engine 110 to compute a gradient of the objective function at the model 202 in question. Online learning algorithms (e.g., first order online learning algorithms) may then be used to find a new model 206 given the current model 202 and the gradient which acts as an update for the current model 202. This sequence may be repeated to make continued improvements to the model 206 as well as other models 210 of the search service 102, such as to improve how a model 202 ranks items for a particular type of content as well as how results from a plurality of models for different types of content may be combined to form a search result 112.

In an implementation example, a multiplicative algebraic reconstruction (MART) algorithm is used for learning ensembles of trees. The MART algorithm learns an ensemble of trees such that each additional tree is used to add the inverse to the gradient of a loss function given the model generated by the previous trees. Therefore, a current ensemble may be used to make predictions. By collecting feedback 204 from users of the client device 104, a gradient may be determined and therefore a tree may be added to the ensemble to predict the inverse gradient. Hence, in each iteration one or more trees use the feedback, while the old data is encoded in previous trees in the ensemble and thus is not "re-processed" by the search service 102. Compression techniques may also be leveraged to reduce a size of an ensemble. For example, the search service 102 may first "learn" a small ensemble that makes similar predictions to the predictions of the current model 202 to form the update 208.

Although specific examples were described above, it should be readily apparent that a variety of different objective functions and learning algorithms may be used by the techniques described herein. Further, an objective function may defined to address a variety of additional criteria, such as to take into account additional properties of an entity that is to be displayed as part of a search result 112, such as a display size of the entity.

Thus, the techniques described herein may leverage incremental learning, e.g., online learning, to reduce unpredictability of a model. In each step, for instance, the algorithm may be used to improve on top of a current model. Therefore, the algorithm may be used to evaluate a current offering without re-processing "old" data. Additionally, these techniques may be employed without relying on human judgments but rather may leverage feedback that describes actual user engagement with a search result 112.

Further, use of data describing engagement (e.g., feedback 204) with the current model 202 as a signal to improve the model 202 may effectively reduce an amount of data used in each step of the process, and thus may be performed efficiently and "more often" then conventional techniques, thereby supporting improved responsiveness. Yet further, the "old" data is effectively embodied in the model 202 itself and thus a new model 206 generated may still address this "old" data that was used to generated the mode 202.

Figure 3:
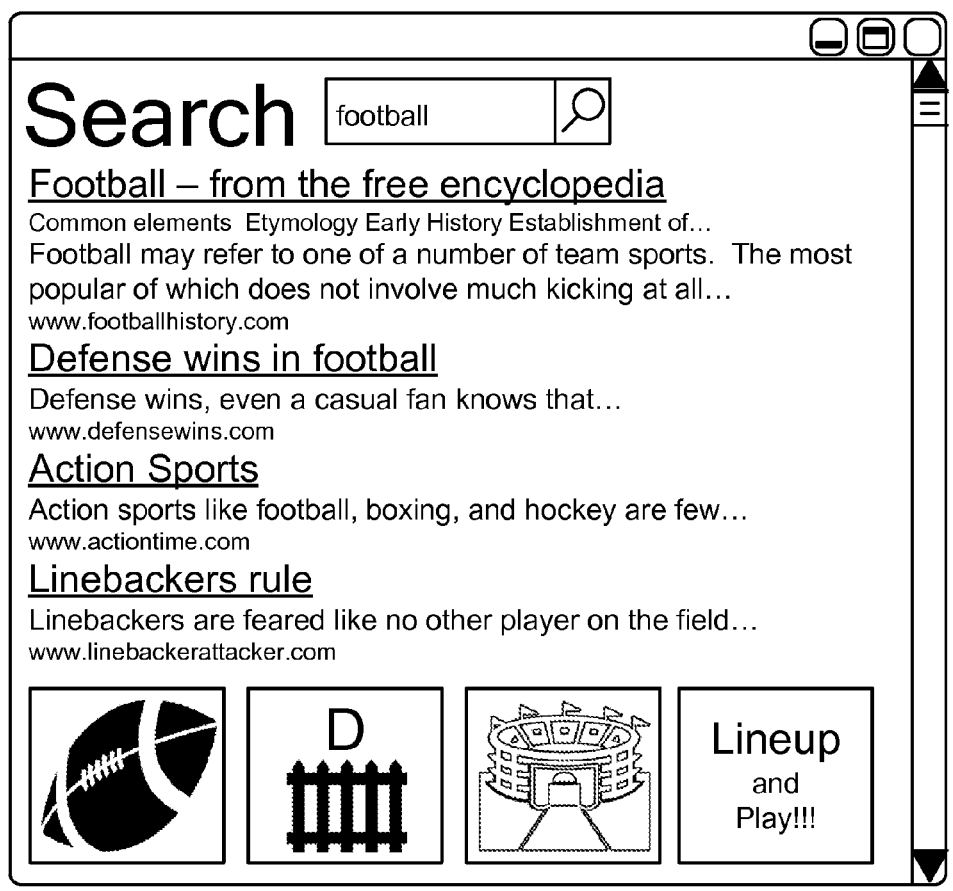
FIG. 3 is an illustration of an example search result page obtained from a model of a search engine, the page including a plurality of items having different content types.

These techniques may therefore be used to make incremental changes to a search result. For example, a search result 300 may be received at a client device 104 from the search service 102 as shown in FIG. 3. Feedback 204 from client device describing interaction with the search result may then be provided back to the search service 102, e.g., which may describe a number of clicks with individual items in the search result, such as a webpage and/or images in the search result 300. Thus feedback 204 may then be used to update 208 the model 202 such that a search result 400 obtained from the updated model 208 does not greatly differ from the previous search result 300 yet does address goals, such as to rank particular items higher in the search result. Further discussion of these and other techniques may be found in relation to the following procedures.

Example Procedures

Figure 4:
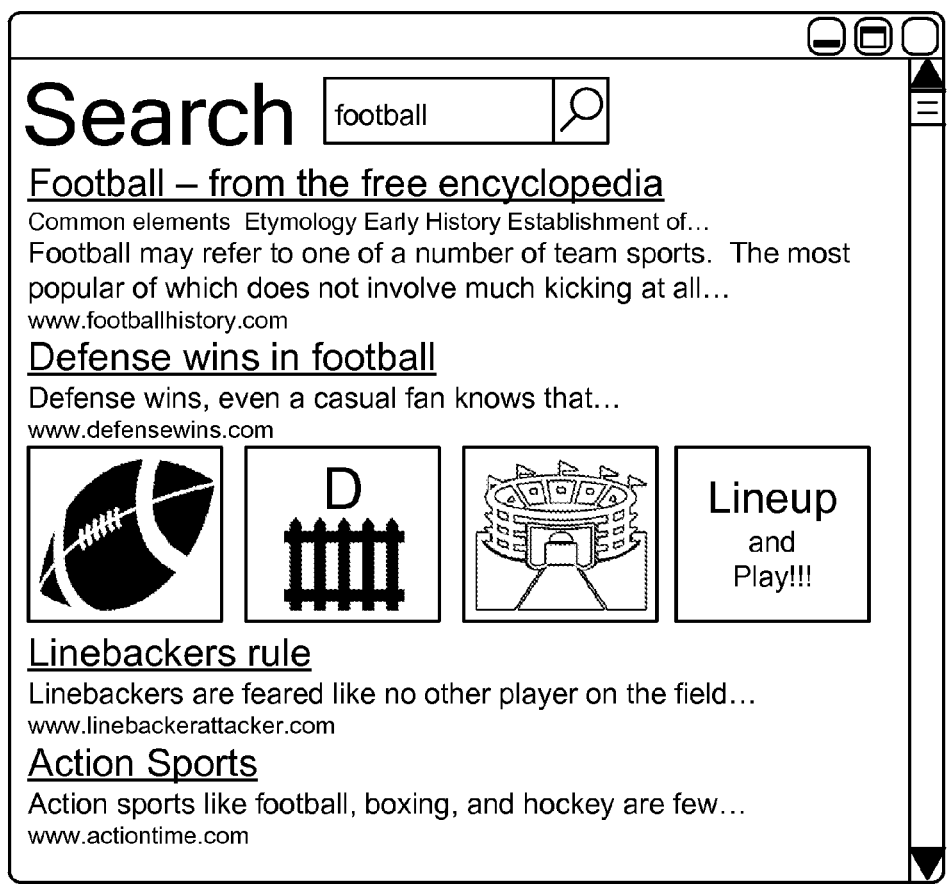
FIG. 4 is an illustration of another example search result page obtained from a model that is updated using feedback that describes user engagement with the search result page of FIG. 3.

The following discussion describes search model update techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2, and the search results 300, 400 of FIGS. 3 and 4.

Figure 5:
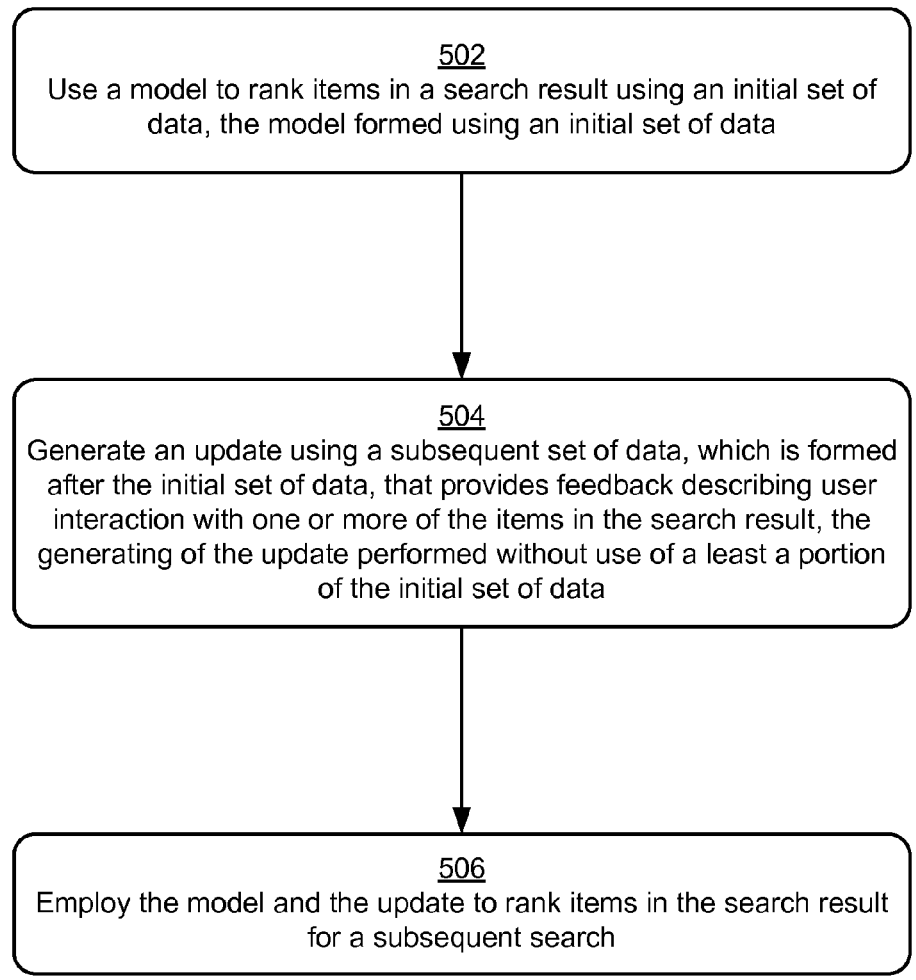
FIG. 5 is a flow diagram depicting a procedure in an example implementation in which a search model is updated without using data used to form the search model.

FIG. 5 depicts a procedure 500 in an example implementation in which a search model is updated without using data used to form the search model. A search service uses a model to rank items in a search result, the model formed using an initial set of data (block 502). Model 202, for instance, may be formed from a variety of different types of data (e.g., "bot" data as described earlier) to model which items are to be included in a search result and how items in a search result are to be ranked in relation to each other.

An update is generated using a subsequent set of data, which is formed after the initial set of data, that provides feedback describing user interaction with one or more items in the search result formed using the model, the generating of the update performed without use of at least a portion of the initial set of data (block 504). The update 208, for instance, may be formed through use of an objective function and gradient to model feedback 204. This may be done without using the data that was a basis for forming the model 202 described in the previous example, e.g., index data and so on.

The model and the update are employed to rank items in a search result for a subsequent search (block 506). The model 202 and the update 208, for instance, may be used to form a new model 206 that is used to rank items in a search result to be returned to a client device 104 for output. A variety of other examples are also contemplated.

Thus, currently available data may be used to generate a ranking model. Users may then be served using the model, and feedback may be collected from the users. A new model may be computed as a derivative of the current model and the feedback collected and this process may iterate to continue to update the model.

Figure 6:
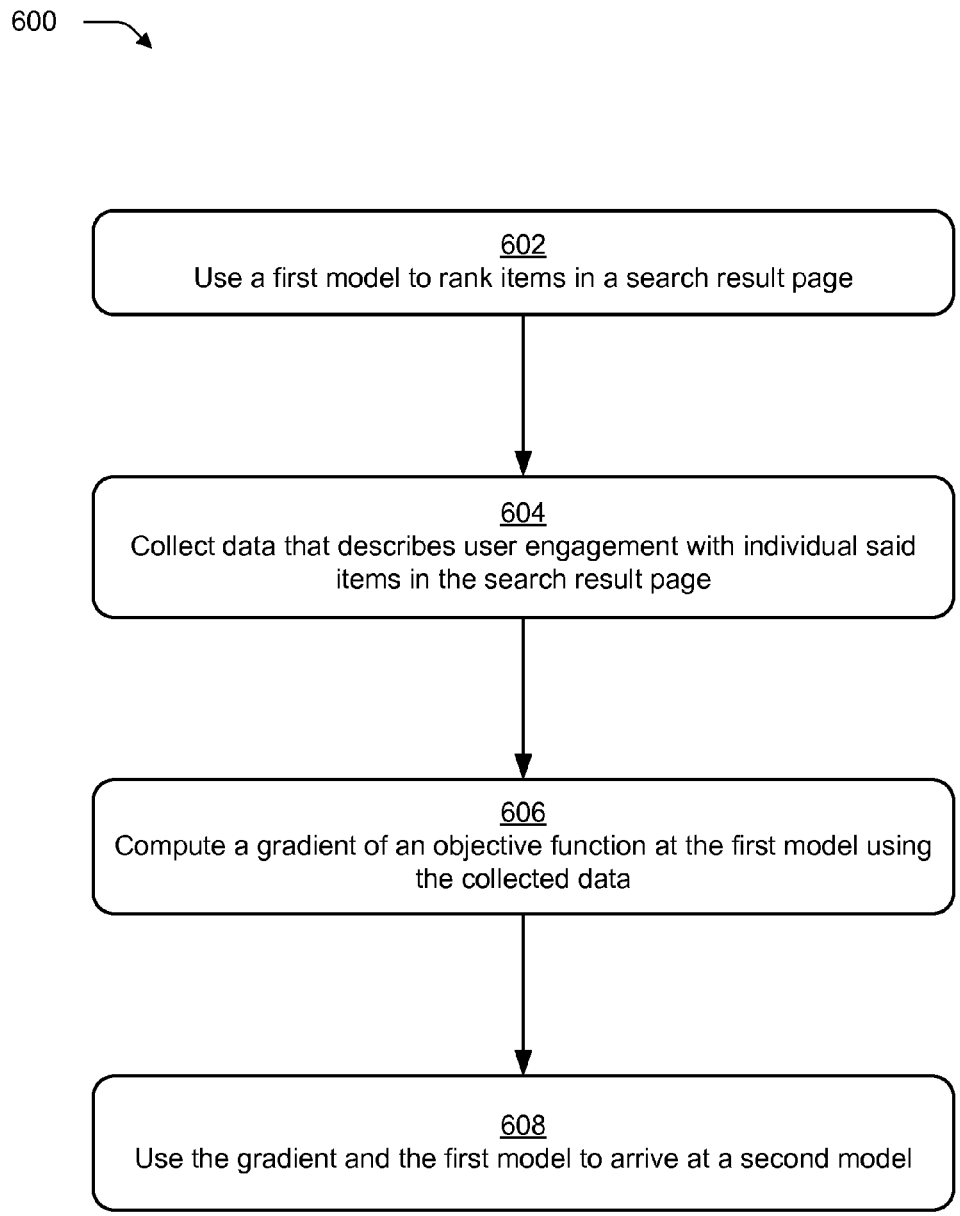
FIG. 6 is a flow diagram depicting a procedure in an example implementation in which a gradient is computed to update a model used to rank items in a search result.

FIG. 6 depicts a procedure 600 in an example implementation in which a gradient is computed to update a model used to rank items in a search result. A search service uses a first model to rank items in a search result page (block 602). As before, this model may be formed in a variety of ways from a variety of different types of data.

The search service also collects data that describes user engagement with individual items in the search result page (block 604). The data, for instance, may describe an amount of times relative items were "clicked" by users.

Figure 7:
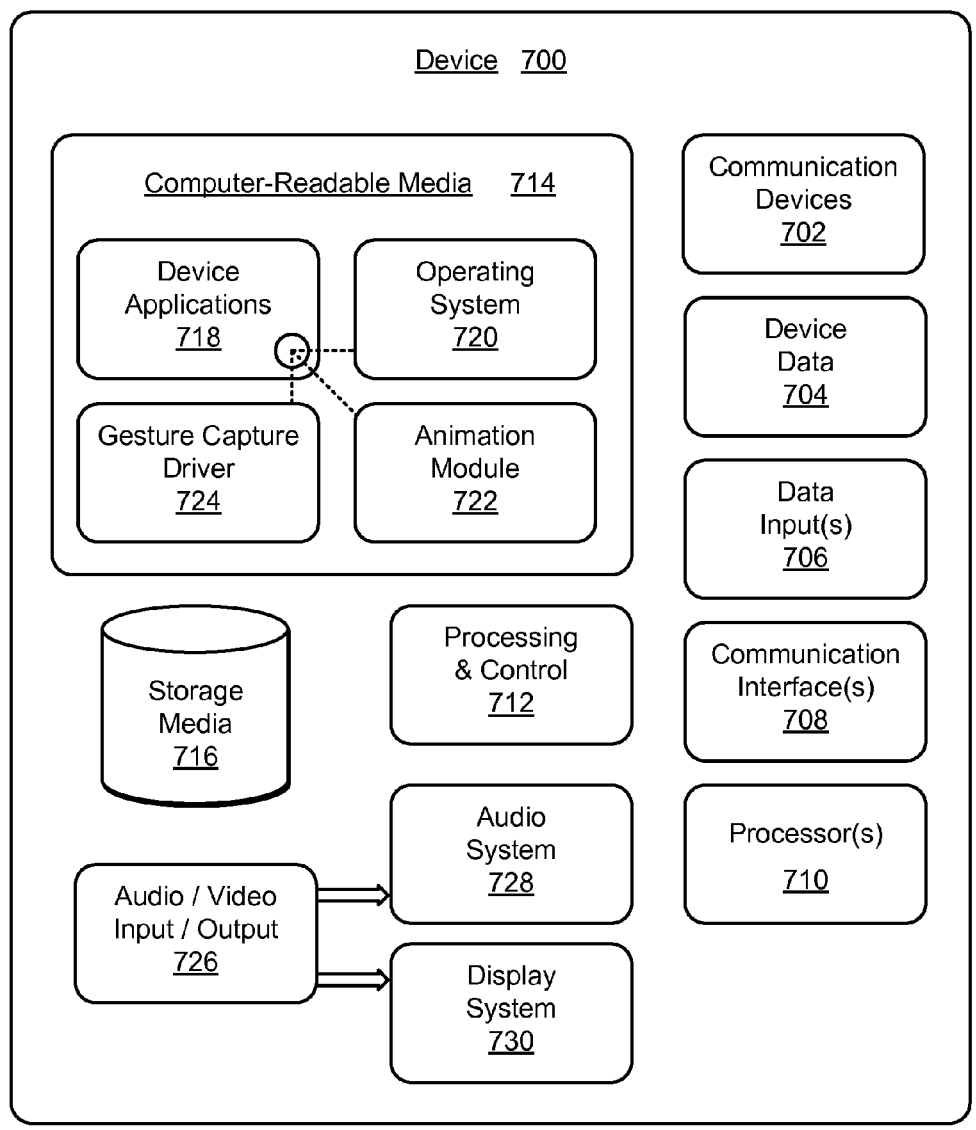
FIG. 7 illustrates various components of an example device that can be implemented as any type of computing device as described with reference to FIGS. 1-4 to implement embodiments of the techniques described herein.

A gradient of an objective function is computed at the first model using the collected data (block 606). The gradient, for instance, may be used to reflect the feedback 204 received from the users. The gradient and the first model are used to arrive at a second model (block 608). Thus, in this example the data used to compute the gradient does not include the data used to form the model (that data being captured by the model itself), which may be used to efficiently construct the data without "re-processing" data as was done using conventional techniques. As should be readily apparent this process may be repeated to generate additional updates as previously described. A variety of other examples are also contemplated as previously described in the above discussion Example Device FIG. 7 illustrates various components of an example device 700 that can be implemented as any type of computing device as described with reference to FIGS. 1-4 to implement embodiments of the techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of the techniques described herein. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the techniques described herein. In this example, the device applications 718 include an interface application 722 and an input/output module 724 that are shown as software modules and/or computer applications. The input/output module 724 is representative of software that is used to provide an interface with a device configured to capture inputs, such as a touchscreen, track pad, camera, microphone, and so on. Alternatively or in addition, the interface application 722 and the input/output module 724 can be implemented as hardware, software, firmware, or any combination thereof. Additionally, the input/output module 724 may be configured to support multiple input devices, such as separate devices to capture visual and audio inputs, respectively.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices of a search service, the method comprising:
   using a model to rank items in a search result, wherein the search result describes different types of content to be displayed on a same results page, the model formed using an initial set of data;
   generating an update using a subsequent set of data, which is formed after the initial set of data, that provides feedback describing user interaction with one or more of the items in the search result, the generating of the update performed without use of at least a portion of the initial set of data; and
   employing the update to modify the model and adjust the ranking of items in the search results page for a subsequent search.

2. The method as described in claim 1, wherein the different types of content include at least two of a webpage, image, video, shopping, news, or maps.

3. The method as described in claim 1, wherein the subsequent set of data describes an amount of interaction with respective items in the search results.

4. The method as described in claim 3, wherein the amount of interaction is described at least in part based on a number of clicks associated with the respective items.

5. The method as described in claim 1, further comprising:
   generating a second update using another subsequent set of data, which is formed after the initial set of data and the subsequent set of data, that provides feedback describing user interaction with one or more of the items in the search result formed using the model and the update, the generating of the update performed without use of at least a portion of the initial set of data and the subsequent set of data; and
   employing the second update to modify the model as previously modified by the update by adjusting the ranking of items in a search result for a subsequent search.

6. The method as described in claim 5, wherein the generating of the second update is performed without use of the initial set of data or the subsequent set of data.

7. The method as described in claim 1, further comprising:
   generating a second update using another subsequent set of data, which is formed after the initial set of data and the subsequent set of data, that provides feedback describing user interaction with one or more of the items in the search result formed using the model and the update; and
   employing the second update to modify the model to rank items in a search result for a subsequent search.

8. The method as described in claim 7, wherein the generating of the second update is performed without use of the initial set of data and the subsequent set of data.

9. The method as described in claim 1, wherein the generating of the update is performed without using the initial set of data.

10. The method as described in claim 1, wherein the generating of the update is performed by computing a gradient of an objective function at the model using the subsequent set of data.

11. The method as described in claim 1, wherein the generating is performed at least in part by employing a multiplicative algebraic reconstruction (MART) algorithm.

12. The method as described in claim 1, wherein the generating is performed using an algorithm that is configured to learn an ensemble of trees such that each additional said tree is configured to add an inverse to a gradient of a loss function given the model that was generated using previous said trees.

13. A method implemented by one or more computing devices of a search service, the method comprising:
   using a first model to rank items of a plurality of content types against each other in a search result page;
   collecting data that describes user engagement with individual said items in the search result page;
   computing a gradient of an objective function at the first model using the collected data; and
   using the gradient to modify the first model to arrive at a second model to rank items of a plurality of content types against each other in a search result page.

14. The method as described in claim 13, wherein the using of the first model to rank items, and using the gradient and first model to arrive at a second model are performed at least in part through use of one or more machine-learning algorithms.

15. The method as described in claim 13, wherein the using is performed at least in part by employing a multiplicative algebraic reconstruction (MART) algorithm.

16. The method as described in claim 13, wherein the using of the gradient employs an algorithm that is configured to learn an ensemble of trees such that each additional said tree is configured to add an inverse to the gradient of a loss function given the first model that generated using previous said trees.

17. The method as described in claim 16, wherein the previous said tress used to generate the first model are not utilized, directly, to generate the second model.

18. A method implemented by one or more computing devices of a search service, the method comprising:
   forming a search result page that includes a plurality of items of varying content types that are ranked against each other through use of a plurality of models, each said model being configured to rank different types of content and formed using an initial set of data;
   receiving feedback that describes user interaction with one or more search results formed using the plurality of models;
   generating one or more updates for respective said models using feedback in which each said update is generated without use of the initial set of data; and
   using the generated one or more updates to modify the plurality of models to adjust the ranking of items in a subsequent search result page for a subsequent search.

19. The method as described in claim 18, wherein the generating of the update is performed by computing a gradient of an objective function at the model using the feedback.

* * * * *